United States Patent [19]
Gstöhl et al.

[11] Patent Number: 5,727,307
[45] Date of Patent: Mar. 17, 1998

[54] METHOD FOR MANUFACTURING AN ARMATURE FOR AN ELECTRIC MOTOR

[75] Inventors: Eugen Gstöhl, Vaduz, Liechtenstein; Hans-Gerd Hoeptner, Tübingen, Germany

[73] Assignee: Vacontec, Vaduz, Liechtenstein

[21] Appl. No.: 646,235

[22] PCT Filed: Nov. 10, 1994

[86] PCT No.: PCT/EP94/03709

§ 371 Date: May 13, 1996

§ 102(e) Date: May 13, 1996

[87] PCT Pub. No.: WO95/14324

PCT Pub. Date: May 26, 1995

[30] Foreign Application Priority Data

Nov. 15, 1993 [DE] Germany ............. 43 38 913.9

[51] Int. Cl.$^6$ ................................ H02K 15/10
[52] U.S. Cl. ............. 29/597; 29/598; 264/272.2; 310/43; 310/235
[58] Field of Search ............. 29/597, 598, 733; 310/235, 43; 264/272.19, 272.2

[56] References Cited

U.S. PATENT DOCUMENTS 1,857,175  5/1932  Apple .
3,212,170  10/1965  Marshall ............. 29/598 X
4,263,711  4/1981  Sakamo et al. ............. 29/598

FOREIGN PATENT DOCUMENTS 1308147  12/1989  Japan .
808168  1/1959  United Kingdom .

OTHER PUBLICATIONS

Patent Abstract of Japan, vol. 14, No. 108 (E–0896), Feb. 1990.

Primary Examiner—Carl E. Hall
Attorney, Agent, or Firm—Shenier & O'Connor

[57] ABSTRACT

An armature for an electric motor with a shaft, a stack of laminations arranged on the shaft, a commutator likewise arranged on the shaft and comprising several commutator segments and a plastic filling, and a wire winding wound around the stack of laminations and welded to the commutator is manufactured by first fixedly arranging a commutator blank without plastic filling by means of an auxiliary assembly device on the shaft, then attaching and welding the wire winding to the commutator blank, subsequently filling the assembly consisting of commutator blank, stack of laminations and wire winding with plastic and uniting it into an inherently stable, compact unit, and, finally, removing the auxiliary device again.

16 Claims, 8 Drawing Sheets

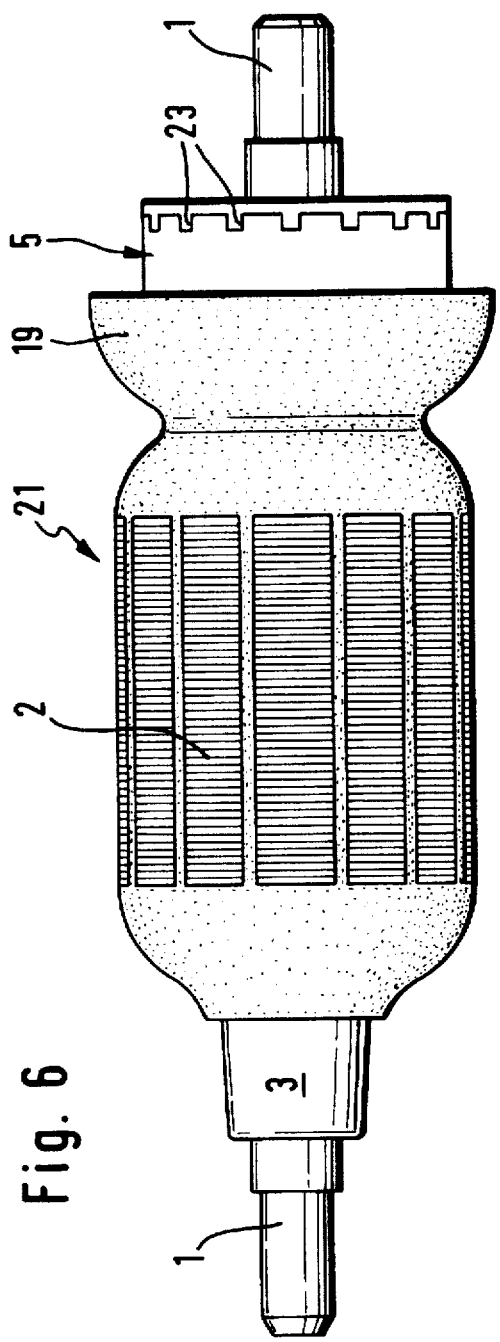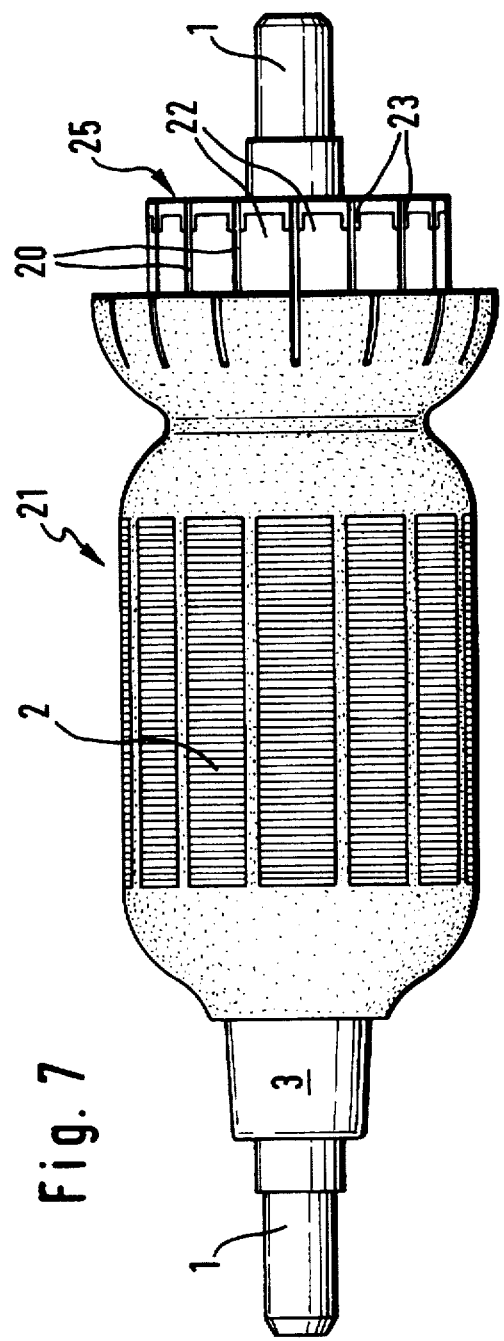

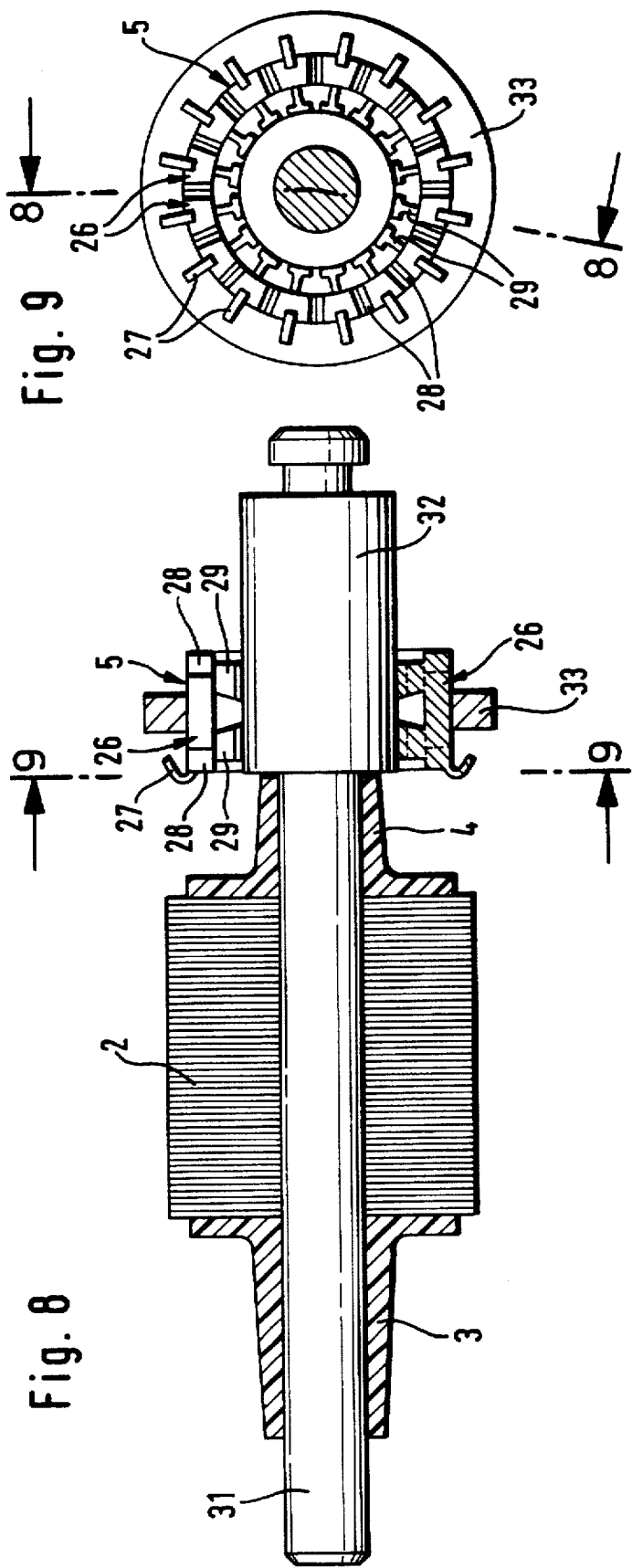

METHOD FOR MANUFACTURING AN ARMATURE FOR AN ELECTRIC MOTOR

BACKGROUND OF THE INVENTION

1. Field of the Invention

The invention relates to a method for manufacturing an armature for an electric motor with a shaft, a stack of laminations arranged on the shaft, a commutator likewise arranged on the shaft and comprising several commutator segments and a plastic filling, and a wire winding wound around the stack of laminations and welded to the commutator.

2. The Prior Art

In the methods hitherto generally performed for manufacturing such armatures, prefabricated components are used, in particular, a prefabricated commutator, and the commutator comprises the usual ring consisting of copper segments insulated from one another and a plastic filling introduced into the interior of the ring and usually consisting of thermosetting plastic, with a central bore. The stack of laminations and the commutator are pushed with a tight fit onto the shaft, and the stack of laminations can be additionally supported at the end faces thereof. The wire winding consisting of insulated copper wire is then placed around the stack of laminations so as to extend in the grooves thereof and is connected by welding to the individual segments of the commutator so that all of the commutator segments are provided with wires and the wire winding comprises a previously determined number of windings. During the joining of the copper wire to the commutator segments, such heat is generated that the enamel insulation of the copper wire burns off, and the wire may start to glow. Finally, a casting lacquer is introduced in drops into and cured in the area of the wire winding between commutator and stack of laminations so that the individual wires of the wire winding are fixed in relation to one another.

The armatures for electric motors manufactured in accordance with the hitherto method have two main disadvantages: The prefabricated commutator is fixed on the armature shaft by being pushed with its inner plastic filling with a press fit onto the shaft. Since the shaft diameter for achieving the press fit is somewhat larger than the bore in the plastic filling of the commutator, the commutator is necessarily widened somewhat, in all, which can cause loosening of the firm seating of the commutator segments in the plastic filling and impairment of the running characteristics of the electric motor. As long as the plastic filling of the commutators consisted of thermosetting plastics filled with asbestos, the filling had an excellent elasticity and a very strong adhesion to the copper metal of the commutator and so the aforementioned disadvantage virtually did not occur. However, such thermosetting plastics filled with asbestos are now no longer allowed to be used in view of their detrimental effect on health.

The further main disadvantage of the armatures manufactured in accordance with the above method originates from the welding of the wires to the commutator segments, which is carried out under the action of strong heat. The welding temperatures must be so high that the insulating enamel of the copper wire burns. This results in temperatures occurring at least for a short time at the commutator, which are higher than those tolerated by the thermosetting plastics forming the plastic filling. The welding thus results in a certain damage in advance to the commutator. As long as the commutators comprised thermosetting plastics containing asbestos, the high welding temperature was unproblematic because these thermosetting plastics were insensitive to heat to that extent. However, damage to the asbestos-free plastic filling of the commutator owing to the high welding temperatures now likewise results in a considerable reduction in the service life of the electric motor armature.

SUMMARY OF THE INVENTION

Therefore, the object of the invention is primarily to propose a new method for manufacturing armatures for electric motors with a stack of laminations which is free from the deficiencies explained hereinabove and results in a firm seating of the commutator on the armature shaft, but not in damage to the commutator in the course of the welding of the wire winding, in particular, also when the commutator has an asbestos-free plastic filling.

The object is accomplished in accordance with the invention by a) first fixedly arranging a commutator blank without plastic filling by means of an auxiliary assembly device on a shaft, then b) attaching the wire winding and welding it to the commutator blank, subsequently c) enclosing the assembly consisting of commutator blank, stack of laminations, wire winding and auxiliary assembly device with a mold, with the auxiliary assembly device forming part of this mold and codetermining the outer shape of the plastic filling, then d) filling the assembly consisting of commutator blank, stack of laminations, wire winding and auxiliary assembly device in the mold with plastic and uniting it into an inherently stable, compact unit, and, finally, e) after removal of the assembly from the mold, removing the auxiliary device again, and making the commutator blank into the final commutator.

From U.S. Pat. No. 3,212,170 it is known to mold the armature of an electric motor with plastic after its winding has been soldered to the commutator. However, this relates to armatures without a stack of laminations, which can only be employed for special electric motors. An auxiliary assembly device, as provided in accordance with the invention, which not only serves to perform the assembly operation of the commutator, but also functions as part of the mold, is missing in the aforementioned publication.

BRIEF DESCRIPTION OF THE DRAWINGS

The following description of preferred embodiments of the invention serves in conjunction with the appended drawings to explain the invention in further detail. The drawings show:

FIG. 3 a view of the armature from FIG. 1 at a subsequent manufacturing stage after a wire winding has been partly wound on;

FIG. 6 the armature removed from the mold according to FIG. 5;

FIG. 7 the armature from FIG. 6 after slots have been sawn in a commutator blank;

FIG. 8 a sectional view of another embodiment of an armature for an electric motor taken along line 8—8 in FIG. 9;

FIG. 9 a sectional view taken along line 9—9 in FIG. 8;

DETAILED DESCRIPTION OF THE PREFERRED EMBODIMENTS

The main steps of the inventive method for manufacturing an armature for an electric motor are described hereinbelow with reference to FIGS. 1 to 7.

Figure 2:
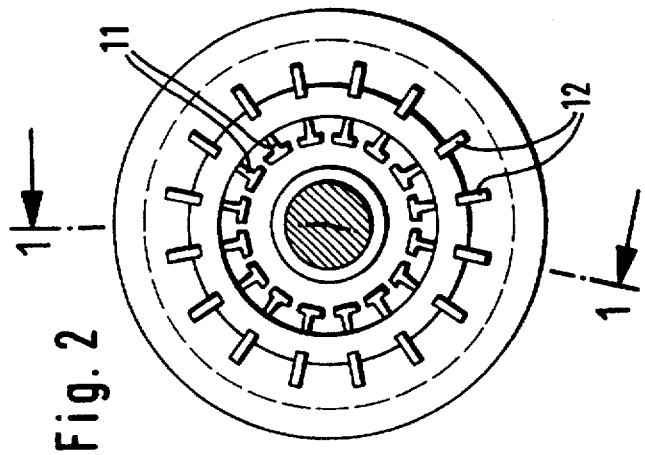
FIG. 2 a sectional view taken along line 2—2 in FIG. 1.
Figure 1:
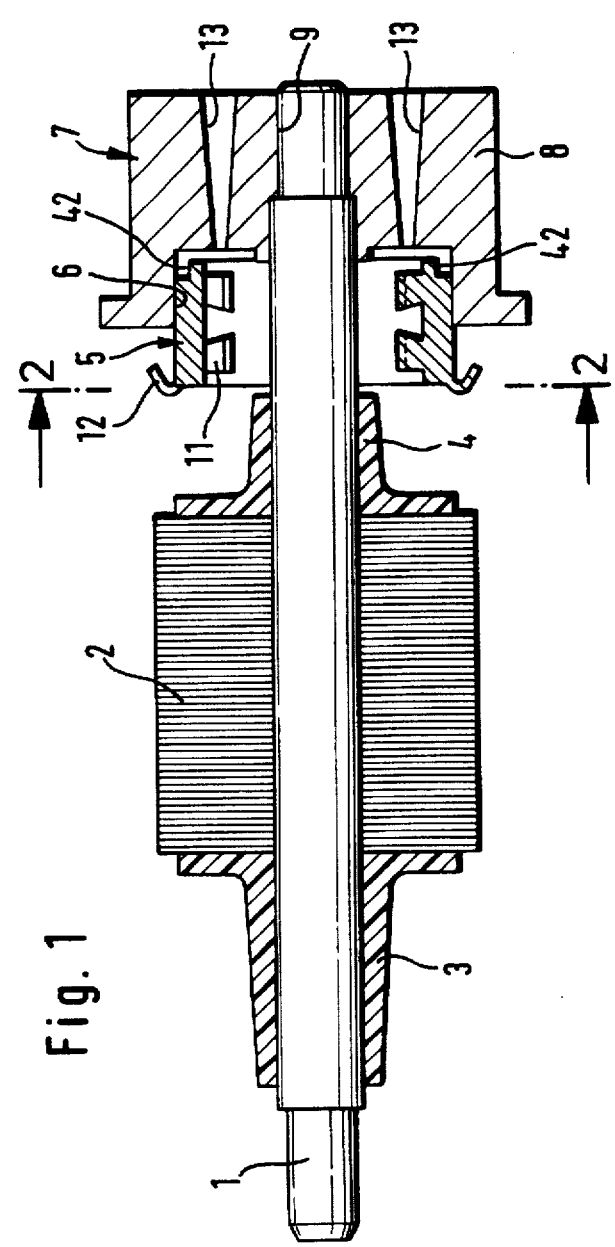
FIG. 1 a sectional view of an armature for an electric motor at a certain manufacturing stage taken along line 1—1 in FIG. 2.

As shown in FIG. 1, a stack of laminations 2 is pushed in the usual way with a tight fit onto a shaft 1 of an armature for an electric motor. The first and last laminations of the stack of laminations are additionally supported by hat-shaped sleeves 3 and 4, respectively, at the end faces of the stack of laminations 2. A commutator blank 5 in the form of a continuous ring made of copper is inserted with a tight fit into a corresponding cylindrical recess 6 of an auxiliary assembly device 7. The auxiliary device 7 has the shape of a cylindrical assembly bush and comprises a relatively thick bottom part 8 with a central bore 9, with which the auxiliary device 7 is pushed with a tight fit onto the end of the shaft 1. The ring-shaped commutator blank 5 is thereby firmly supported at the side of the stack of laminations 2 in a cantilever manner over the shaft 1, and, in particular, a relatively large space remains free between the inner side of the commutator blank 5 and the outer side of the shaft 1.

Integrally formed on the ring-shaped commutator blank 5 are small feet 11 of T-shaped cross section which are oriented radially inwardly and are mutually spaced from one another. Likewise integrally formed on the commutator blank 5 on the side thereof facing the stack of laminations 2 are hooks 12 which are mutually spaced from one another.

Several channels 13 provided on the auxiliary assembly device 7 extend continuously in the axial direction from the free end face of the auxiliary device 7 into the free space inside the commutator blank 5.

Figure 3:
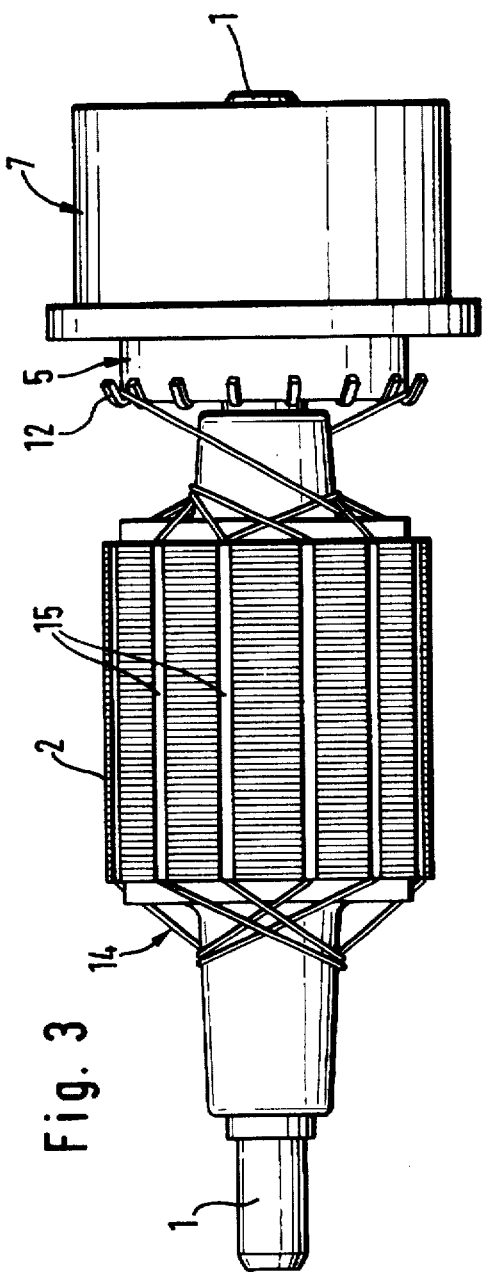

FIG. 3 shows a manufacturing stage of the armature at which a wire winding 14 is partially wound onto the stack of laminations 2. On the one hand, the wire winding extends in grooves 15, which are usually provided in the stack of laminations 2, and, on the other hand, it is welded with its ends in a likewise conventional manner to the hooks 12 of the commutator blank 5. During the welding operation, the commutator blank 5 is held firmly on the shaft 1 by the auxiliary device 7. Since the commutator blank is not filled with plastic, it cannot be damaged by the action of the heat occurring during the welding. In the course of the welding, the wire forming the wire winding 14 is heated in the area of the hooks to the extent that an enamel insulation located on the wire—usually copper wire—melts, and an electrically conductive connection is established between the hooks 12 and the wire.

Figure 4:
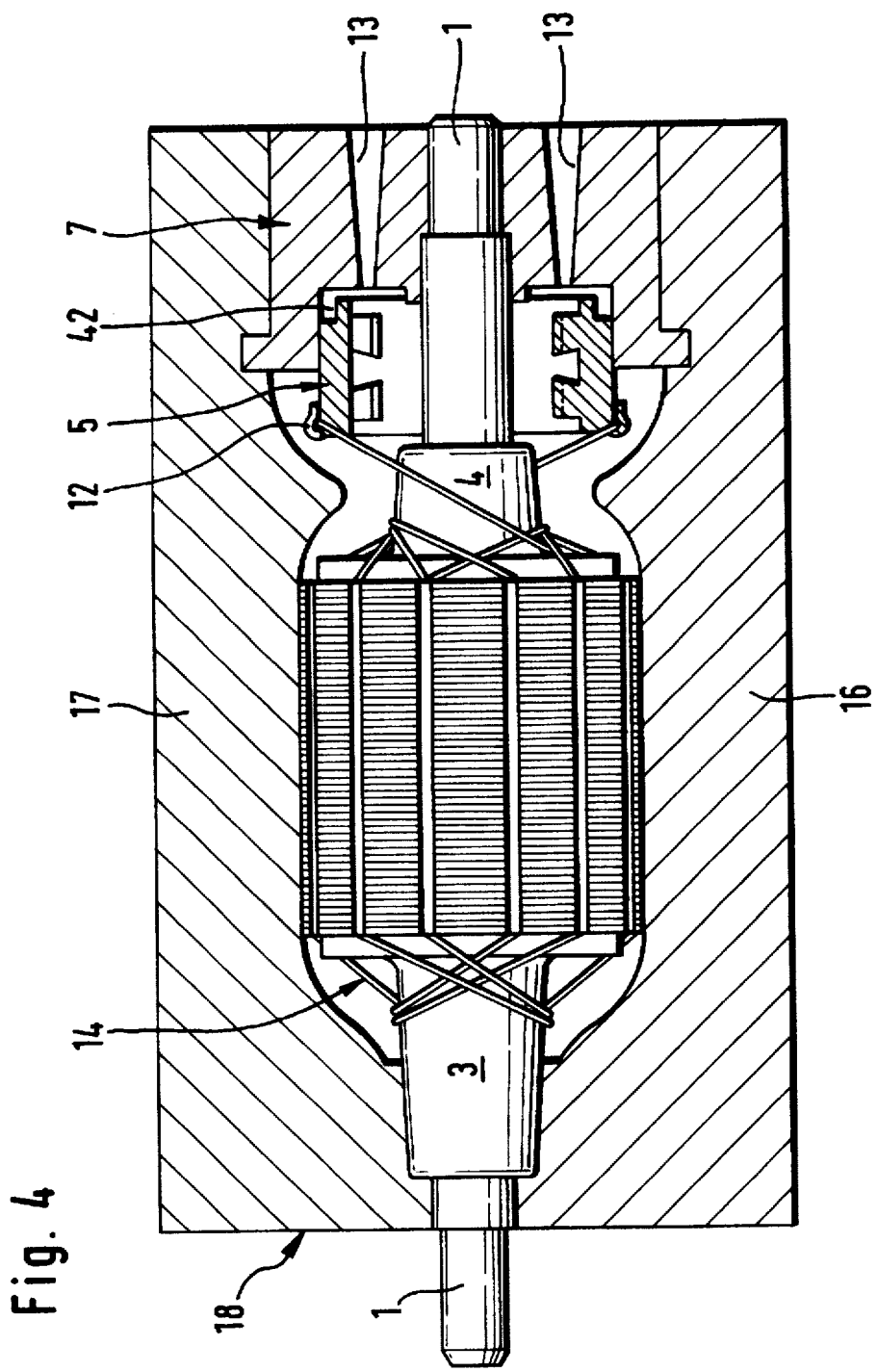
FIG. 4 the armature from FIG. 3 in a casting or injection mold.

After completion of the wire winding 14, the hooks 12 are bent towards the commutator blank 5—possibly simultaneously with the welding—in the way shown in FIG. 4. The unit consisting of shaft 1, stack of laminations 2, commutator blank 5, auxiliary assembly device 7 and wire winding 14 is then placed in a mold 18 consisting of two halves 16, 17, as shown in FIG. 4. The one end wall of the auxiliary assembly device 7 (on the left in FIG. 4) forms part of the mold 18 by closing off its cavity towards the one side. The unit described hereinabove is held securely in the cavity of the mold 18, on the one hand, (on the left in FIG. 4) by the shaft 1 and, on the other hand, (on the right in FIG. 4) by the auxiliary device 7.

Figure 5:
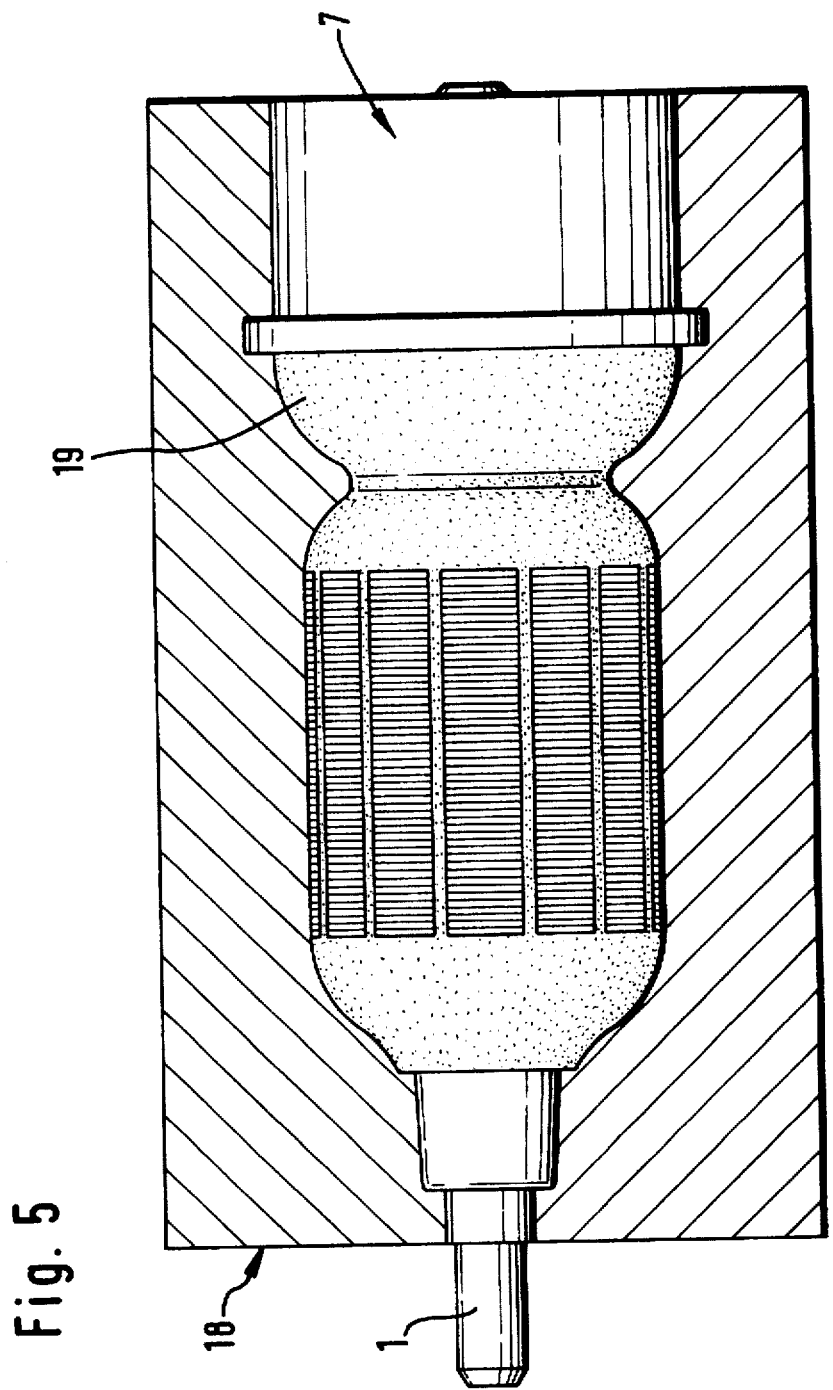
FIG. 5 the mold from FIG. 4 filled with plastic.

A plastic filling is now introduced, in particular, by injection molding, transfer molding or compression molding, through the channels 13 of the auxiliary assembly device 7 into the cavity of the mold 18. The thus introduced plastic fills out all of the free spaces of the mold 18, in particular, the space inside the commutator blank 5, and also encloses the wire winding 14 including the hooks 12 on the commutator blank 5, as shown in FIG. 5, in which the plastic filling is denoted by reference numeral 19. The small feet 11 serve to anchor the commutator blank 5 firmly in the plastic.

FIG. 6 shows the armature 21 released from the mold 18 and cast with plastic, after the auxiliary assembly device 7 has been subsequently removed from the commutator blank 5, so the surface of the latter is now freely exposed.

FIG. 7 shows the armature 21 in its final stage of manufacture which differs from the stage of manufacture according to FIG. 6 in that axially parallel slots 20 have now been sawn in the area of the commutator blank 5 between the individual hooks 12 covered by plastic. These slots extend through the entire blank as far as its inner plastic filling, thereby producing individual commutator segments 22 which are electrically separated from one another. Each one of these commutator segments is connected in the conventional manner by the hook 12 integrally arranged on it to a corresponding part of the wire winding 14. The slots 20 are sawn over the entire axial extent of the commutator blank 5, i.e., starting each time from the edge carrying the hooks 12 to the opposite edge.

As shown in FIG. 7, on this opposite edge of the commutator blank 5, in the area of the slots to be sawn, "windows" 23, in which the slot terminates, are formed on both sides. Such windows 23 can also be formed between the hooks 12 on the opposite edge of the commutator blank. The sawing is carried out with the aid of a small circular saw, with the cut starting at the edge of the commutator blank 5 carrying the hooks 12 and terminating in the windows 23 at the opposite edge. The windows filled with plastic prevent the saw blade from forming a burr on the individual commutator segments when it exits, and so the danger of a electrical short circuit is eliminated.

The final commutator 25 is thus produced from the original commutator blank 5.

The finished commutator 25 is firmly anchored on the shaft 1 by the plastic subsequently pressed into the interior of the commutator blank 5. The hitherto existing danger of expansion of the commutator when the commutator previously filled with plastic is subsequently pressed onto the shaft 1 is eliminated. Since the welding of the wire winding 14 to the hooks 12 of the commutator blank 5 is also carried out prior to introduction of the plastic filling 19, the latter is in no way damaged by the heat occurring during the welding, and, therefore, the service life of an electric motor equipped with an armature made in the manner described hereinabove is not shortened. Since the plastic filling 19 is not subjected to the action of heat in the course of the manufacture of the armature 21, other plastics than those hitherto used can also be employed, for example, also thermoplastics.

FIGS. 8 to 11 serve to explain a further embodiment of the invention. In contrast to the embodiment according to FIGS. 1 to 7, in the embodiment according to FIGS. 8 to 11 the commutator blank 5 does not consist of a ring closed within itself and made, for example, from a band of sheet copper, but, from the start, of individual commutator segments 26 with hooks 27, windows 28 and small, radially inwardly projecting feet 29. An auxiliary shaft 31 with a thicker cylindrical section 32 is used to hold these individual commutator segments such that they lie in contiguous relation to one another in a circle. The small feet 29 of the commutator segments 26 are supported on the outside of the thicker shaft section 32 and are held together on the outside by a solid ring 33 made of metal. This results in a commutator blank 5 which corresponds substantially to the commutator blank 5 according to FIGS. 1 and 2, with the exception that it is not of "cantilever" design, but is held together similarly to an arch by the thicker shaft section 32 located on the inside and the outer ring 33. The individual commutator segments 26 lie with their side walls in immediately adjacent relation to one another, i.e., in electrically conductive contact with one another.

Figure 10:
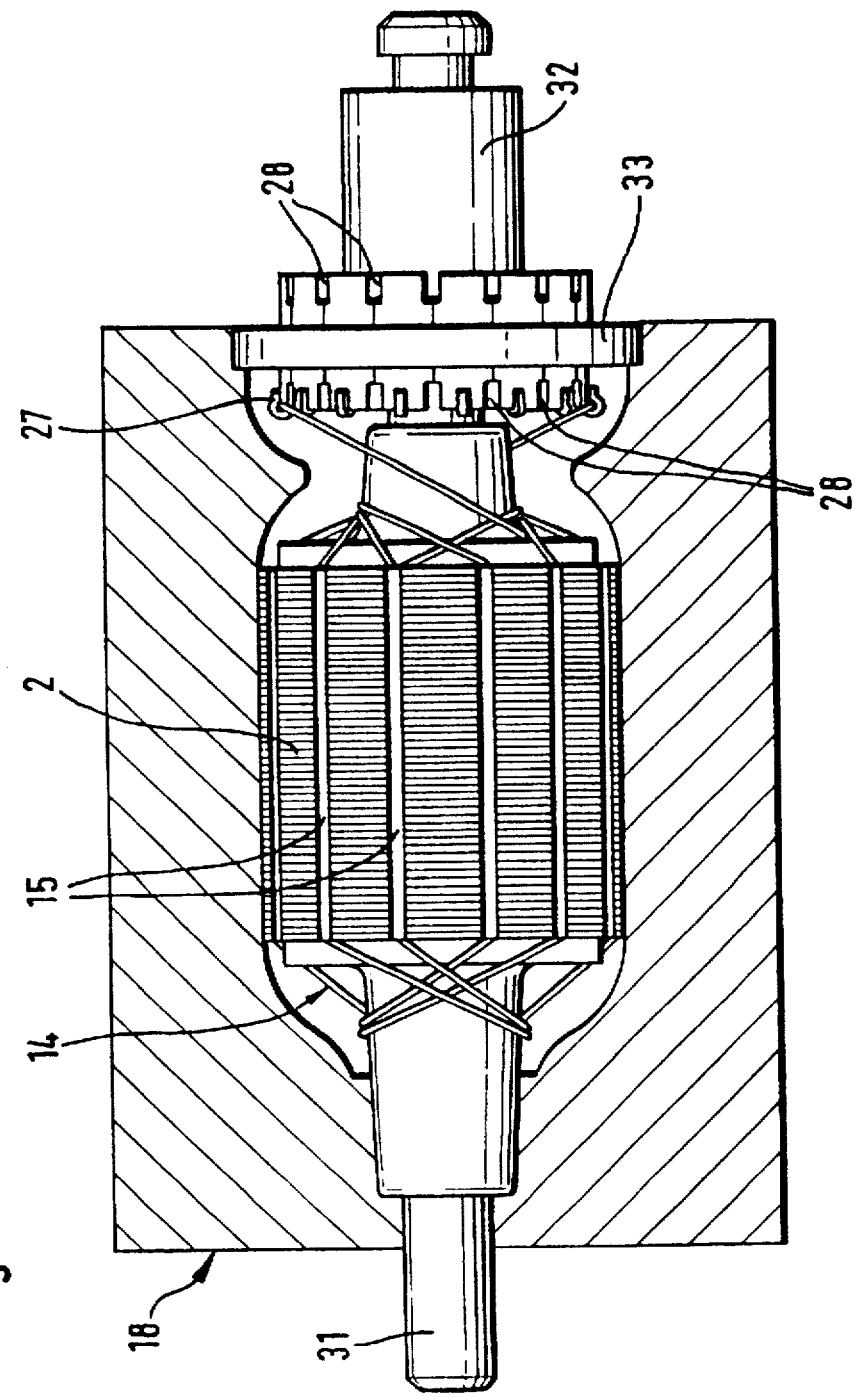
FIG. 10 the armature from FIG. 8 in a mold.
Figure 11:
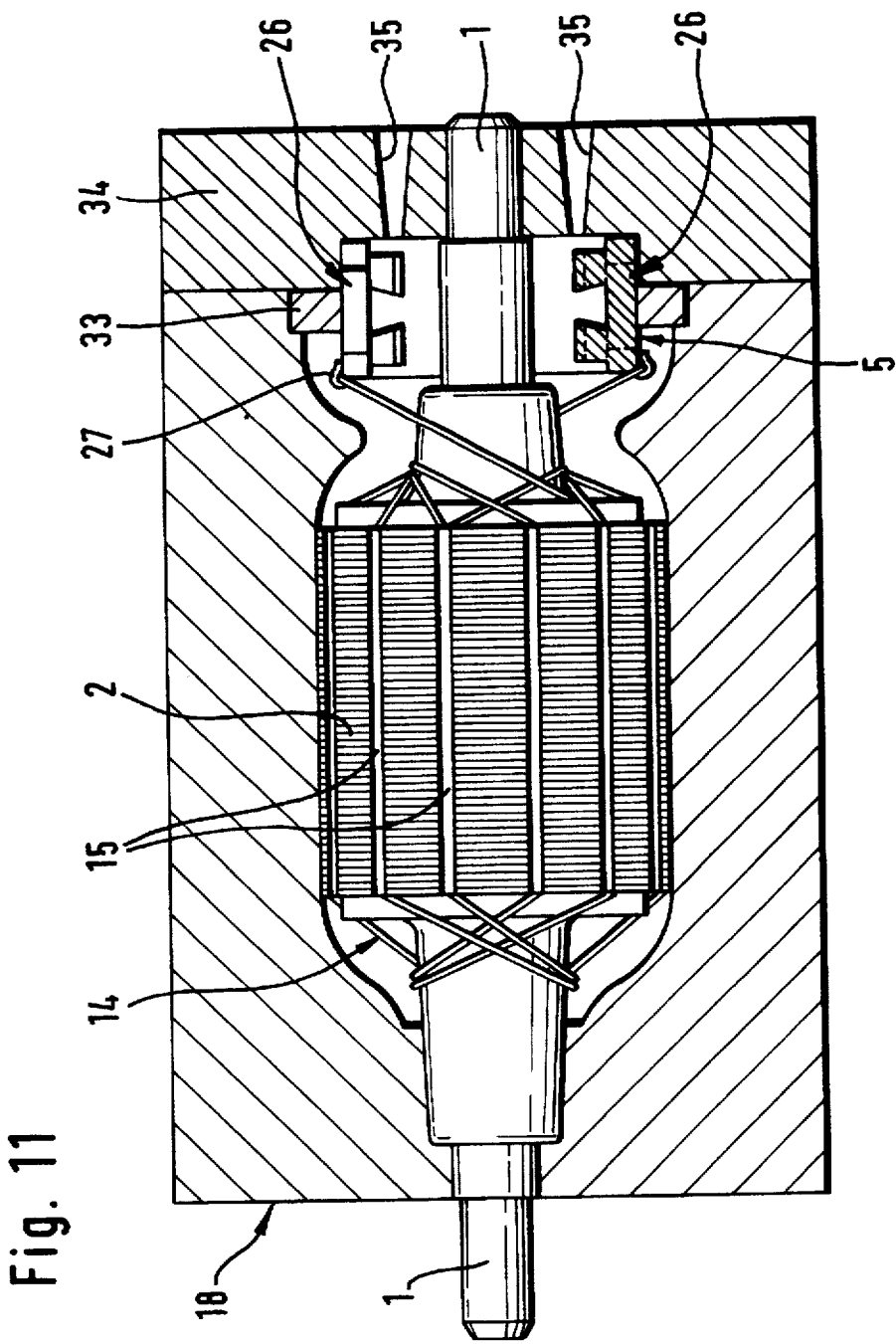
FIG. 11 the armature from FIG. 10 after an auxiliary shaft has been exchanged for a final armature shaft.

The stack of laminations 2 and the sleeves 3, 4 are also fitted on the shaft 31 in the manner described hereinabove (cf. FIG. 1). As shown in FIG. 10, the assembly is then placed in a mold 18, in accordance with FIG. 4, with the ring 33 now serving to hold the assembly in the mold 18. Before the assembly was placed in the mold 18, the wire winding 14 was attached and welded to the hooks 27 in the manner likewise described hereinabove, and the hooks were then bent, as shown in FIG. 10. The auxiliary shaft 31 is then pulled out and replaced by the actual or final armature shaft 1 (FIG. 11). As shown, the commutator blank 5 comprised of the individual commutator segments 26 is held in the mold 18 in a cantilever manner via the ring 33 and forms a free space towards the shaft 1. A cover 34 with channels 35 is now placed tightly on the mold 18 and plastic is pressed in so as to fill the entire free spaces in the mold 18, in particular, the ring-shaped space between shaft 1 and commutator blank 5. After the plastic has cured, the armature filled with and enveloped by plastic is removed from the mold 18. After removal of the ring 33, sawing is then carried out continuously between the individual commutator segments 26 as far as the plastic filling in the manner likewise described hereinabove so as to produce commutator segments which are electrically insulated from one another. These are held together by the plastic filling and are each connected to a corresponding part of the wire winding 14 via the hooks 27. The final product obtained after completion of the method in accordance with FIGS. 8 to 11 corresponds virtually to the product shown in FIG. 7.

It is to be noted that in the methods described hereinabove, the grooves 15 of the stacks of laminations which receive the wire winding 14, possibly with insulating strips of paper placed therebetween, are also filled with plastic, as indicated in FIG. 5, when the plastic is introduced.

Figure 12:
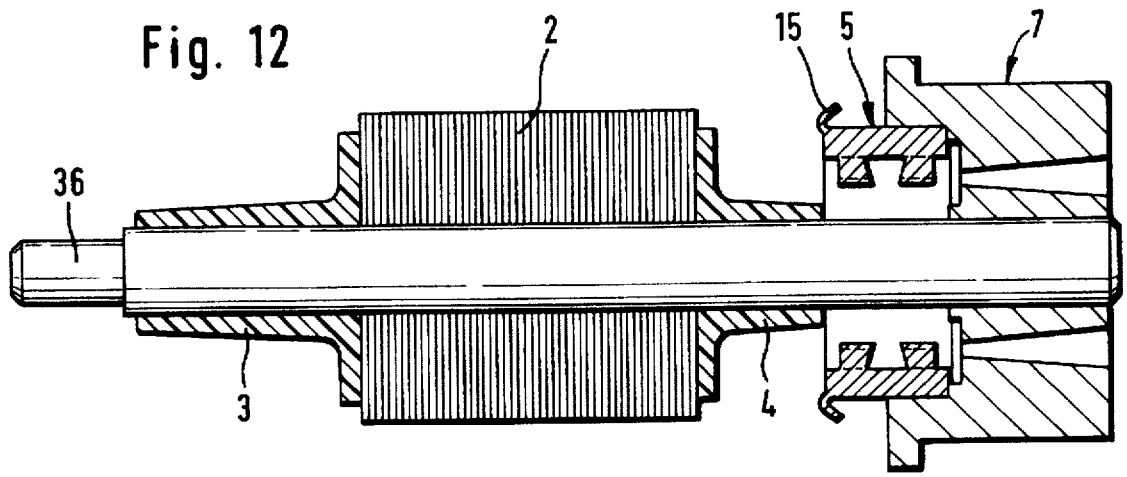
FIG. 12 a sectional view of a further embodiment of an armature for an electric motor with an auxiliary shaft.
Figure 13:
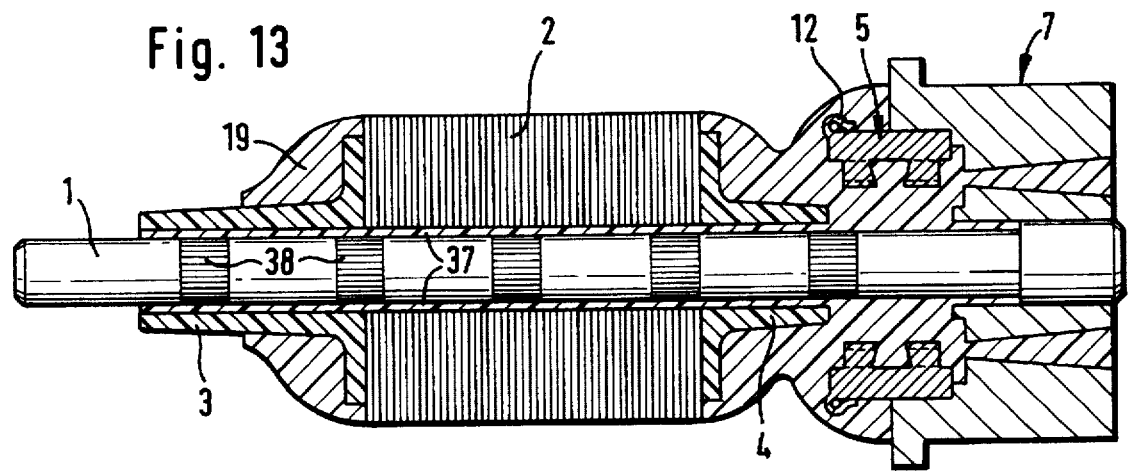
FIG. 13 the armature from FIG. 12 cast with a plastic filling after the auxiliary shaft has been exchanged for the final armature shaft.

In the embodiments of electric motor armatures according to FIGS. 12 and 13, a ring-shaped commutator blank 5 closed within itself is again used. It is held in an auxiliary assembly device 7 in the form of a cylindrical assembly bush.

In other respects, FIG. 12 corresponds substantially to FIG. 1. However, in contrast to FIG. 1, in FIG. 12 it is not the final armature shaft 1 but an auxiliary shaft 36 that is used. After formation of the wire winding 14 and connection thereof to the hooks 12 of the commutator blank 5 (not shown in FIGS. 12 and 13), the thus prepared armature is inserted with the auxiliary shaft 36 into a mold 18 (similar to FIG. 4). The auxiliary shaft 36 is now pulled out (towards the right) and replaced by the actual armature shaft 1 (FIG. 13) which has a smaller diameter than the auxiliary shaft 36. This produces in the mold between the shaft 1 and the inner sides of the stack of laminations 2 and also the sleeves 3, 4 a ring-shaped space which is likewise filled with plastic and so an electrically insulating plastic tube 37 is formed between the stack of laminations 2 and the shaft 1. Electrically insulated armatures such as are prescribed for certain electric apparatus can be manufactured in this way.

Furthermore, as is shown in FIG. 13, the shaft 1 has knurled portions 38 for better adhesion of the plastic to the shaft.

Figure 14:
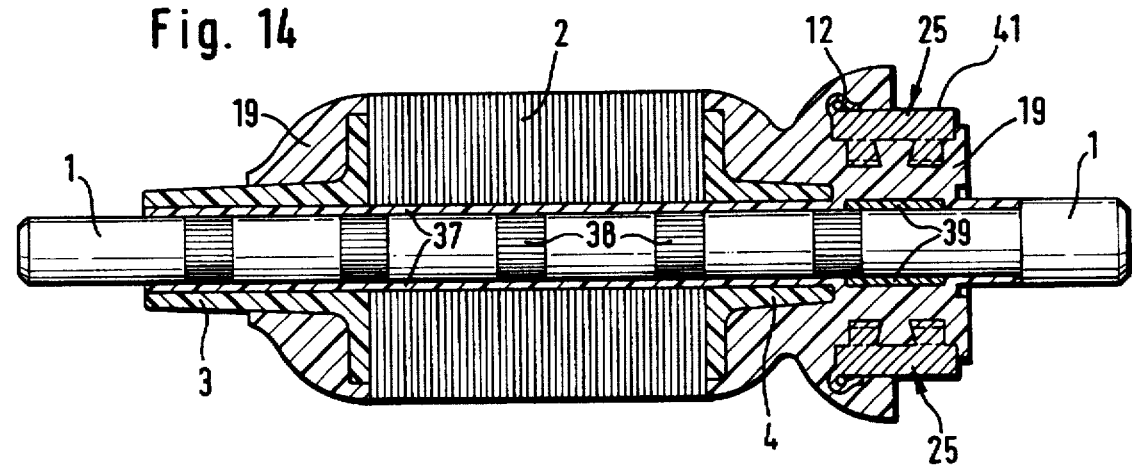
FIG. 14 a further embodiment of an armature for an electric motor with double insulation in the area of the commutator.

Finally, FIG. 14 shows a further modified embodiment of an armature for an electric motor, which was manufactured in accordance with the method described hereinabove and is "double insulated" due to a relatively short tube 39 made of electrically insulating material being arranged between the plastic filling 19 in the area of the commutator blank 5 and the shaft 1. This tube 39 is mounted before the plastic filling 19 is injected into the mold 18.

In another embodiment of the invention similar to that which was described in conjunction with FIGS. 8 to 11, electrically insulating layers made, for example, of micanite, are inserted between the individual commutator segments 26 of the commutator blank 5. In this case, the subsequent sawing of the slots between the commutator segments 26 is dispensed with, since these are electrically insulated from one another from the start.

On the other hand, from the start, individual commutator segments of which the commutator blank 5 is made up can be held centrally in relation to the armature shaft 1 at mutual spacings in the mold by a correspondingly adapted auxiliary device 7 such that the plastic flows in between the individual segments and insulates these electrically from one another. In this case, too, the subsequent sawing of slots can be dispensed with.

In the course of the finishing, the armature also has to be balanced. This can be carried out advantageously in the following way: After removal from the mold and prior to turning of the brush track of the commutator, the armature around which plastic has been injected is clamped on the outside of the stack of laminations, and bearing seats are then ground or turned at the ends of the shaft 1. The balancing is then carried out in the manner known per se. It is, however, to be expected that the correction to be made during this operation will be relatively small. After measuring the balance error and after turning the brush track of the commutator, a further possibility consists in so adjusting two cutter or grinding heads placed at the ends of the armature shaft 1 eccentrically in their center axial position in relation to the center axis of the armature shaft 1 and then so machining the bearing seats at the shaft ends that the balance error is thereby compensated.

In the embodiments of the invention described hereinabove, the wire winding 14 is connected to hooks 12 or 27 of the commutator. Instead of such hooks, it is also possible to use slots in the commutator blank into which the wire ends of the wire winding are welded.

As described hereinabove and illustrated, plastic can be molded over the hooks 12, 27 on the commutator to the extent that a sufficiently wide brush track remains on the commutator itself. This brush track is denoted by reference numeral 41 in FIG. 14, but, in reality, it can be made wider by the plastic coating covering the hooks 12 extending less far over the commutator 25.

For improved fixing of the commutator 25 on the armature shaft 1, it is also possible to provide knurls or splints—similar to the knurls 38 in FIGS. 13 and 14—in the area of the commutator for providing good adhesion to the injected plastic.

As described hereinabove, with commutators 25 which from the start consist of individual, mutually insulated commutator segments 26, i.e., do not have to be sawn, it may prove expedient to stabilize these segments on the outside by plastic rings injected onto them. On the one hand, such stabilization is already effected by injecting plastic over the hooks 27 connected to the wire winding 14 (FIG. 11). On the other hand, as explained hereinbelow with reference to FIG. 1, shoulder-like recesses 42 in the form of steps can be provided at the edges of the individual segments 26 facing away from the hooks 12. During the injection molding, these likewise become filled with plastic and form a ring which stabilizes the individual segments 26.

We claim:

1. A method for manufacturing an armature for an electric motor comprising the steps of:
    a) securing a commutator blank to an auxiliary assembly device and mounting the auxiliary assembly device onto a shaft;
    b) winding wire conductors onto a stack of laminations positioned on the shaft and welding the wire conductors to the commutator blank;
    c) enclosing the conductors, laminations, and commutator blank within a mold in which the auxiliary assembly device defines a section of the mold wall;
    d) filling the mold with plastic to form a rigid assembly;
    e) withdrawing the rigid assembly from the mold;
    f) removing the auxiliary assembly device from the shaft; and
    g) dividing the commutator blank into a plurality of commutator segments.

2. The method of claim 1, wherein the auxiliary assembly device comprises
    a cylindrical receptacle secured to an outer surface of the commutator blank, and
    a bore frictionally receiving the shaft.

3. The method of claim 1, wherein said step (d) of filling comprises injection molding plastic into the mold.

4. The method of claim 1, wherein said step (d) of filling comprises transfer molding plastic into the mold.

5. The method of claim 1, wherein said step (d) of filling comprises compression molding plastic into the mold.

6. The method of claim 1, wherein the commutator blank comprises
    a first end and an opposite second end, and
    a plurality of slots formed in at least one end which are subsequently filled with plastic.

7. The method of claim 1, wherein the welds between the wire conductors and the commutator blank are encased in plastic.

8. The method of claim 1, wherein said step (g) of dividing comprises cutting a plurality of parallel insulating slots into the commutator blank.

9. The method of claim 1, wherein the stack of laminations includes grooves which receive the wire conductors and are encased by plastic.

10. The method of claim 1, wherein the shaft includes spaced apart ends having bearing surfaces.

11. The method of claim 1, wherein the shaft in step (a) comprises an auxiliary shaft which is exchanged for an armature shaft prior to said step (d) of filling.

12. The method of claim 11, wherein the auxiliary shaft has a larger diameter than the armature shaft, the difference in diameter being occupied by plastic thereby forming additional insulation between the armature shaft and the stack of laminations.

13. The method of claim 1, wherein the commutator blank comprises
    a first end to which the wire conductors are welded, and
    a second opposite end including slots which are filled with plastic.

14. The method of claim 1, wherein the mold is filled with plastic through a sprue formed within the auxiliary assembly device.

15. A method for manufacturing an armature for an electric motor comprising the steps of:
    a) securing a plurality of commutator segments to an auxiliary shaft by encircling the segments with an auxiliary assembly device;
    b) winding wire conductors onto a stack of laminations positioned on the auxiliary shaft and welding the wire conductors to the commutator segments;
    c) enclosing the conductors, laminations, and commutator segments within a mold in which the auxiliary assembly device defines a section of the mold wall;
    d) replacing the auxiliary shaft with an armature shaft;
    e) filling the mold with plastic to form a rigid assembly;
    f) withdrawing the rigid assembly from the mold; and
    g) removing the auxiliary assembly device from the commutator segments.

16. The method of claim 15, wherein the secured commutator segments are electrically insulated from each other.

* * * * *